United States Patent
Rottmayer et al.

[11] Patent Number: 5,772,493
[45] Date of Patent: Jun. 30, 1998

[54] METHOD AND APPARATUS FOR CONTROLLING THE LAPPING OF MAGNETIC HEADS

[75] Inventors: Robert Rottmayer, Fremont; George Tang, Saratoga, both of Calif.

[73] Assignee: Read-Rite Corporation, Milpitas, Calif.

[21] Appl. No.: 509,118

[22] Filed: Jul. 31, 1995

[51] Int. Cl.⁶ .............................. B24B 49/04; B24B 49/10
[52] U.S. Cl. ...................................... 451/5; 451/8
[58] Field of Search .................................. 451/1, 5, 8, 9; 29/603.16, 603.09

[56] References Cited

U.S. PATENT DOCUMENTS

| | | | |
|---|---|---|---|
| 4,912,883 | 4/1990 | Chang et al. | 451/5 |
| 4,914,868 | 4/1990 | Church et al. | 451/5 |
| 5,305,559 | 4/1994 | Ogawa | 451/58 |
| 5,361,547 | 11/1994 | Church et al. | 451/5 |
| 5,494,473 | 2/1996 | Dupuis et al. | 451/28 |

*Primary Examiner*—Robert A. Rose
*Attorney, Agent, or Firm*—Nathan N. Kallman

[57] ABSTRACT

The invention is directed toward a lapping apparatus and method for accurately obtaining the height of a magnetoresistive (MR) element of a magnetic head during a lapping process. The apparatus includes a source for inducing a magnetic excitation field, and a current source for applying a sense current to a prepatterned photolithographically formed MR element. A sensor monitors the resistance of the MR element in response to variations in the magnetic excitation field, and controls the lapping process in response to the monitored resistance of the MR element. In one embodiment, the MR element includes a GMR formed of a stack of parallel MR layers and operates either in a CPP (Current-Perpendicular-to-the Plane) mode or in a CIP (Current-In-the Plane) mode. In a particular embodiment, the magnetic excitation field is generated by a conductor formed on the magnetic head.

15 Claims, 3 Drawing Sheets

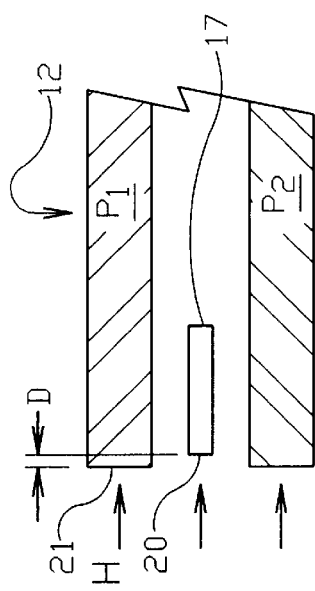
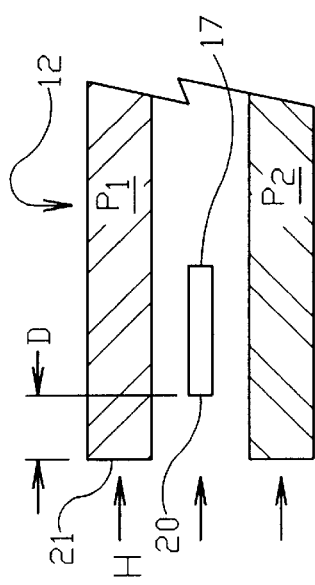
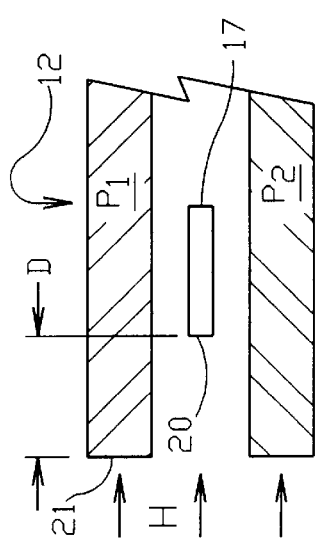
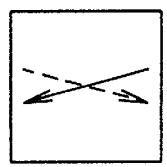
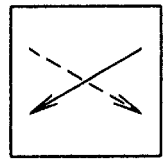
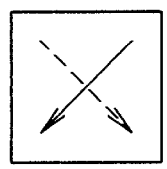
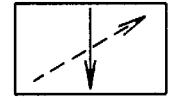
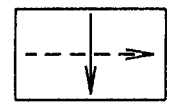

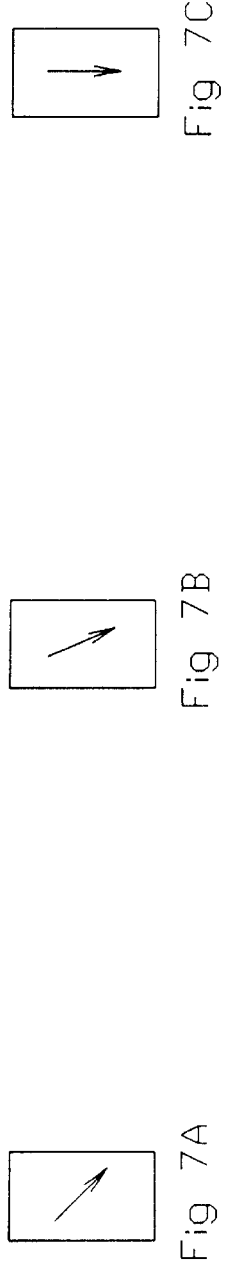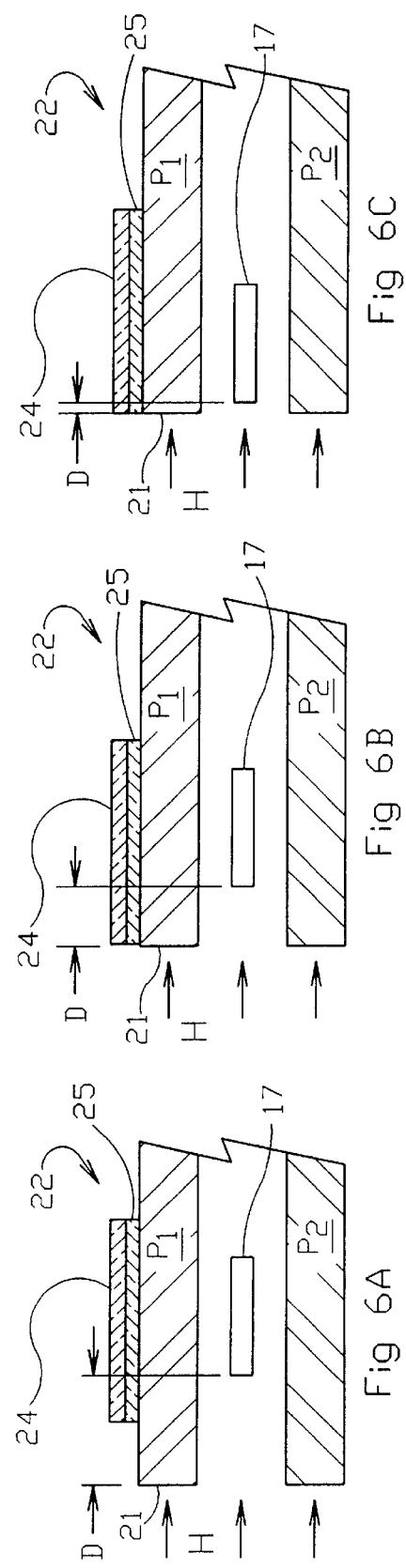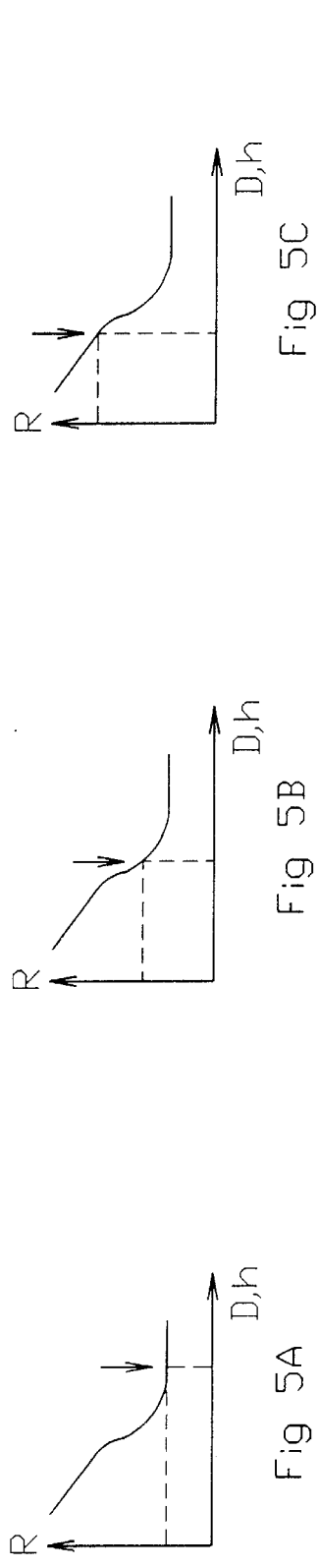

METHOD AND APPARATUS FOR CONTROLLING THE LAPPING OF MAGNETIC HEADS

FIELD OF THE INVENTION

This invention relates to a method and apparatus for controlling the manufacture of magnetic transducers, and in particular to a lapping method and control apparatus used during batch fabrication of magnetic heads.

DESCRIPTION OF THE PRIOR ART

Magnetic heads are used extensively in data processing systems, such as disk drives. During head production, batch fabrication is employed whereby a multiplicity of thin film transducers are deposited in a row on a ceramic bar for lapping, polishing and processing simultaneously. The ceramic bar serves as a support or substrate for the thin film transducers and subsequently is divided into head slider elements. During the manufacture of magnetic heads that are fabricated with both an inductive write transducer and a magnetoresistive (MR) read transducer, the pole tips that define the transducing gap of the inductive transducer and the MR element of the MR transducer are simultaneously ground and lapped to achieve a desired stripe height at which optimum data signal processing can be realized. The stripe height of all the transducers made during a production run for use with a data storage product must be maintained within a defined limited tolerance.

The conventional method for producing a required stripe height of the MR element includes a lapping system in which an abrasive grinding surface accurately laps the tips of the magnetic poles, which also serve as shields, and the MR stripe that is disposed between them to the desired stripe height. A conventional technique for controlling the stripe height during lapping operation is described in U.S. Pat. No. 4,914,868 to Church et al. In this patent, a technique is employed for measuring the resistance of each magnetoresistive (MR) element during lapping, whereby a control signal is generated to terminate lapping when the desired MR element stripe height is reached.

However, a problem associated with this conventional lapping technique is that the MR element is lapped simultaneously with the poles, thus exposing the element to long term corrosion and other damaging effects. Furthermore, since the MR element is lapped, it would be difficult to accurately control its height, as the lapping process depends on extrinsic factors, such as the positioning of the MR element relative to the electrical lapping guides (ELG). Additionally, the lapping of the MR element may result in smearing that can short the MR element to the poles and reduce its sensitivity.

Another conventional practice has been to use a lapping control system incorporating optical lapping guides for visual control by an operator of the lapping process, or electrical lapping guides formed with the magnetic head structure, in order to measure the resistance of the heads during the lapping operation. The measured resistance provides an indication of the distance that has been lapped for an associated transducer which is representative of the stripe height that has been reached by the lapping process. The optical guides depend upon the skill of the operator and the lapping guides, and add to the time and expense of the lapping operation.

SUMMARY OF THE INVENTION

An object of the present invention is to provide a lapping control apparatus that affords a rapid and accurate measurement of the magnetization characteristics of magnetic heads.

Another object of this invention is to provide an MR response measurement apparatus that may preclude the need for optical or electrical lapping guides, and which is relatively low in cost to implement.

A further object of this invention is to provide a method which permits a very accurate control of the MR/GMR element or stripe height, without lapping the stripe.

Yet another object of the present invention is to prevent smearing or corrosion of the MR/GMR element during lapping.

The foregoing and other objects and features of the present invention are realized by providing a lapping control apparatus and method for accurately indicating the stripe height of a magnetic head during a lapping process. The apparatus includes a source for inducing a magnetic excitation field, and a current source for applying a sense current to a pre-patterned photolithographically formed magnetoresistive (MR) element. During lapping of the pole/shield elements, a sensor monitors the resistance of the MR element in response to variations in the magnetic excitation field, and controls the lapping process in response to the monitored resistance of the MR element. In one embodiment, the MR element includes a giant magnetoresistive (GMR) sensor formed of a stack of parallel MR layers and operates either in a CPP (Current-Perpendicular-to-the Plane) mode or in a CIP (Current-In-the Plane) mode. A GMR read sensor is described in U.S. Pat. No. 5,446,613. In a particular embodiment, the magnetic excitation field is generated by a conductor formed on the magnetic head.

BRIEF DESCRIPTION OF THE DRAWINGS

The invention will be described in greater detail with reference to the drawings in which:

FIGS. 2A–2C are side views of a giant magnetoresistive (GMR) head at various stages of the lapping process using the configuration of FIG. 1;

FIGS. 3A–3C diagram a group of snapshots showing the micromagnetic domain distributions, in a CPP (Current-Perpendicular-to-the-Plane) mode, in a biased GMR stripe, as the lapping process progresses, and which correspond to the stages illustrated in Figures 2A through 2C;

FIGS. 4A–4C diagram another group of snapshots showing the micromagnetic domain distributions, in a CIP (Current-In-the-Plane) mode, in a biased GMR stripe, as the lapping process progresses, and which also correspond to the stages illustrated in FIGS. 2A through 2C;

FIGS. 5A–5C represent three plots of the resistance response of the magnetically biased GMR to a varying distance D from the distal edge of the GMR to the surface of a lapping plate, corresponding to the various lapping stages of FIGS. 2A through 2C;

FIGS. 6A–6C are side views of another embodiment of a GMR head at various stages of the lapping process; and magnetoresistive (AMR) stripe.

FIGS 7A–7C represent the response of an anisotropic magnetoresistive (AMR) stripe.

DETAILED DESCRIPTION OF THE PREFERRED EMBODIMENT

Figure 1:
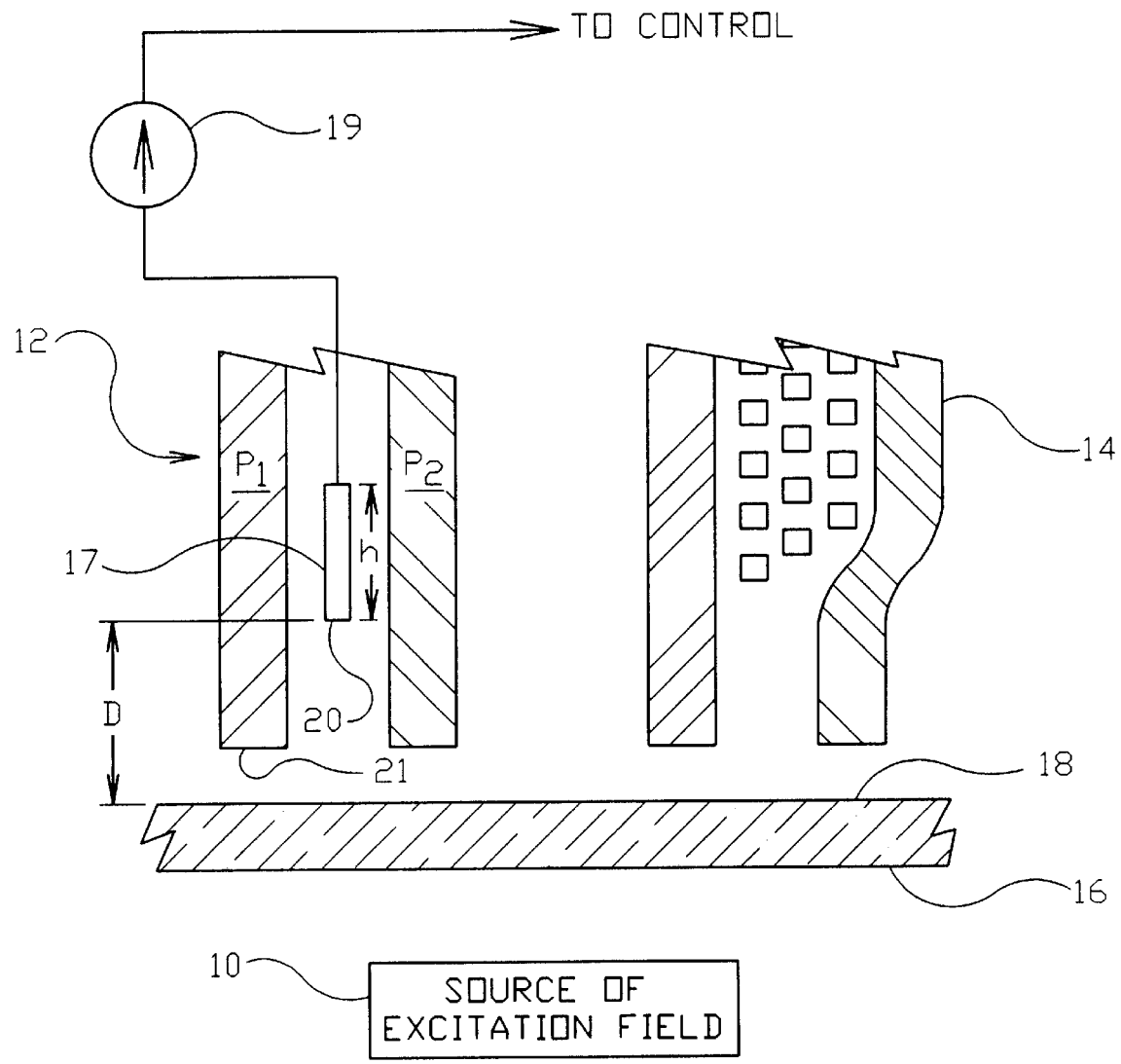
FIG. 1 s a schematic representation of the lapping control apparatus, gas implemented in accordance with this invention.

With reference to FIG. 1, a lapping control apparatus of this invention includes an external source 10 for generating a constant excitation field H of a determined intensity. This external source 10 can be, for example, a permanent magnet, an electric current source which induces a magnetic field, or a combination of these, or other means for providing a field.

A GMR or anisotropic MR head 12 are placed in a generally uniform magnetic field H, on a transfer tool (not shown) at a close distance to a lapping plate 16. The GMR head 12 includes a pre-patterned element or stripe 17 that has been formed by photolithography on the wafer. Either an etch process or a liftoff process could be used to form the stripe 17, with the stripe extended a few microns beyond the bottom of the stripe 17. As a result, the stripe height h is very accurately defined, independently from the lapping process. The stripe 17 is shielded by and disposed between the two magnetic poles P1 and P2 which also server as magnetic shields of the GMR head 12, and has its bottom or distal tip 20 at a distance D, which is the shield extension distance from the upper surface 18 of the lapping plate 16.

The GMR stripe 17 may be formed, by way of example, by depositing a plurality of alternating ultra-thin layers of magnetically conductive and nonconductive materials, such as cobalt (Co) and copper (Cu), each layer being approximately 20 Angstroms thick. As known, the electric resistance of the GMR stripe 17 changes in response to the sensed variations in the magnetic flux of the excitation field H.

A sense or reference current is applied to the stripe 17 via a current source 19, and change in resistance of the stripe 17 is monitored. During lapping of the magnetic shields, the resistance of the GMR stripe 17 changes until it reaches a predetermined value, indicating that the distance D or the stripe height h, is within a tolerance level, at which point the lapping is stopped.

While only one head 12 is shown, it should be understood that a greater number of heads can be lapped simultaneously.

FIGS. 2A through 2C illustrate various stages of the lapping process. FIG. 2A represents the start of the lapping process, with the GMR head 12 placed in the magnetic excitation field H. The GMR head 12 has a shield extension distance D which is defined as the distance of the pole throat, between the bottom 20 of the MR stripe 17 and the extremity 21 of the magnetic shields P1, P2. The purpose of the lapping process is to gradually reduce the distance D until it reaches a predefined distance within a tolerance range prior to reaching the MR element or the edge of the MR element. As long as the distance D exceeds this tolerance limit, the stripe 17 remains partially shielded by the magnetic shields P1, P2, which shunt the magnetic field H before it reaches the stripe 17, and therefore prevent its excitation. On the other hand, it is desirable to maintain the distance D within its determined tolerance range to avoid lapping the stripe 17.

FIG. 2B illustrates an exemplary intermediate stage of the lapping process. As the distance D is reduced, more magnetic field reaches the stripe 17, exciting it and causing its resistance to change.

FIG. 2C illustrates the final stage of the lapping process wherein the throat height has reached its tolerance range. In this particular example, the throat height is on the order of a few hundred Angstroms, such that the bottom 20 of the stripe 17 is not exposed, but is rather encapsulated in a protective layer composed, for instance of alumina. As a result, smearing is avoided, and the stripe 17 is protected against electrostatic discharge (ESD). It is also possible to reduce the distance D so as to expose but not lap significantly into the stripe 17.

FIGS. 3A–3C and 4A–4C show the direction of magnetization, in only two exemplary superposed MR layers of the biased stripe 17. The solid arrow indicates the direction of magnetization of the first MR layer, while the dashed arrow indicates the direction of magnetization of the second MR layer.

The snapshot of FIG. 3A shows a first top view of magnetization conditions in two adjacent MR layers, at the start of the lapping process. At the next snapshot (FIG. 3B), the relative position of the stripe to lapping plate distance D has advanced, and the flux of the underlying excitation field H has an increased effect on the stripe 17.

In the CPP mode shown in FIGS. 3A–3C, the sense current is passed through the element 17, such that the major domains of alternate MR layers define a scissor-type configuration when overlaid on top of one another, and when no excitation field H is supplied. The major domain of the first MR layer is biased, with a permanent magnet incorporated in the structure, for example, so as to form a +45° angle relative to a horizontal reference line. The major domain region in the adjacent second MR layer is also biased so as to form a −45° angle relative to the horizontal reference line. This produces an angle difference of about 90° between the major domain regions of the first and second MR layers.

When the external excitation field H is applied, it rotates the scissor-type configuration from the crossed 90° state (FIG. 3A) towards either a closed state, i.e., 0°, or an antiparallel state, i.e., 180°, depending on the polarity of the excitation field H. In the present example shown in FIG. 3C, the scissor-type configuration is rotated toward the antiparallel state. The resultant change in cosine, and the resistance of the MR stripe 17 which is a function of cosine, is therefore from near zero to a maximum positive one (cosine 90°=+1.0) or to a negative one (cosine 180°=−1.0).

Similarly, in the CIP mode, shown in FIGS. 4A–4C as a spin valve configuration with one layer pinned, the sense current is passed through the stripe 17, such that the major domains of alternate MR layers define a 90° configuration when no excitation field H is supplied. The major domain of the first MR layer is fixed, and is not affected by the excitation field H. The major domain region in the adjacent second MR layer is preferably biased so as to be oriented −90° relative to its unbiased orientation by the excitation field. This produces an angle difference of approximately 90° between the major domain regions of the first and second MR layers due to the bias.

When the excitation field H is supplied, it rotates from the crossed 90° state (FIG. 4A) towards either a closed state (i.e., 0°) or an antiparallel state (i.e., 180°), depending on the polarity of the excitation field. In the example shown in FIG. 4C, the magnetizations are rotated toward the antiparallel state. The resultant change in cosine, and the resistance of the MR stripe 17, which is a function of cosine, is therefore from zero to a positive one or to a negative one. The resultant change in resistance of the MR stripe 17 therefore indicates the polarity of change of the excitation field H, and the direction of the applied field H determines whether the resistance increases or decreases.

FIGS. 5A–5C illustrate the change in the resistance of the stripe 17 relative to the distance D from the lapping plate 16 to the stripe 17. The plots in FIGS. 5A–5C show that as the distance D decreases, the resistance R of the stripe 17 increases, until it reaches a plateau (FIG. 5C), indicating that the desired distance D has been reached whereupon the lapping operation is stopped.

FIGS. 6A through 6C are side views of another GMR head 22 at various stages of the lapping process. The GMR head 22 is generally similar to the GMR head 12, with similar references indicating similar components. The overall lapping operation of the GMR head 22 is also similar to that of the GMR head 12, with the difference that the source of the excitation field H includes an electrical conductor 24 formed on one of the two poles P1 or P2 (in this case P1), and an insulation layer 25 is interposed between the conductor 24 and pole P1.

An electric current is passed through the conductor 24 for generating the excitation field H. The conductor 24 may be lapped with the corresponding pole P1 on which it is formed until the desired distance D is reached.

FIGS 7A–7c show the responses obtained with conventional AMR (anisotropic MR) structures.

It should be understood that the invention is not limited to the specific parameters, materials and embodiments described above. Various modifications and variations may be made within the scope of the present invention.

What is claimed is:

1. A lapping control apparatus having a lapping plate for obtaining a accurate height of a magnetoresistive stripe of a magnetic head which includes magnetic shield elements comprising:

a source for inducing a magnetic excitation field;

a pre-patterned magnetoresistive element having a height and a major plane perpendicular to the direction of said height formed between said magnetic shield elements dispoded in said magnetic excitation field;

a sensor for monitoring the resistance of said magnetoresistive element in response to variations in said magnetic excitation field; and means responsive to said monitored resistance of said magnetoresistive element for controlling the lapping process;

whereby said magnetoresistive element is lapped to a predetermined distance of said magnetic shield elements from said lapping plate.

2. A lapping control apparatus as in claim 1 wherein said magnetic head is a GMR head and said magnetoresistive element is a GMR stripe.

3. A lapping control apparatus as in claim 2 wherein said GMR head has plural layers parallel to said major plane and operates so that current flows in a direction perpendicular to said major plane in a current-perpendicular-to-the plane mode.

4. A lapping control apparatus as in claim 2 wherein said GMR head has plural layers parallel to said major plane and operates so that current flows in a direction parallel to said major plane in a current-in-the plane mode.

5. A lapping control apparatus as in claim 2 wherein said means for controlling includes means for sensing when a predetermined GMR resistance has been reached at which said lapping process is terminated.

6. A lapping control apparatus as in claim 2 wherein said GMR stripe is formed by photolithography.

7. A lapping control apparatus as in claim 1 wherein said source for inducing said magnetic excitation field includes an electrical conductor formed on one of said two magnetic shield elements.

8. A lapping control apparatus as in claim 7 further including an insulator interposed between said conductor and said one of said two magnetic shield elements.

9. A lapping control apparatus as in claim 1 further including a current source for applying a sense current to said magnetoresistive element.

10. A method for obtaining an accurate stripe height of a pre-patterned magnetoresistive stripe disposed between magnetic shield elements of a magnetic head comprising the steps of:

inducing a magnetic excitation field;

placing the magnetic head in said magnetic excitation field;

applying a sense current to said magnetoresistive stripe;

lapping said magnetic shield elements with a lapping plate;

monitoring the resistance of said magnetoresistive stripe in response to variations in said magnetic excitation field; and terminating said lapping in response to the monitored resistance of said magnetoresistive stripe when a predetermined distance between said magnetic shield elements and said lapping plate is reached.

11. A method as in claim 10 wherein said magnetic head is a GMR head that includes a GMR element and has plural parallel layers, further comprising the step of:

operating said GMR head so that current flows in a direction perpendicular to said parallel layers in a current-perpendicular-to-the plane mode.

12. A method as in claim 10 wherein said magnetic head is a GMR head that includes a GMR element and has plural parallel layers, further comprising the step of:

operating said GMR head so that current flows in a direction parallel to said parallel layers in a current-in-the plane mode.

13. A method as in claim 10 further including the step of photolithographically forming said magnetoresistive element.

14. A method as in claim 10 wherein the step of inducing a magnetic excitation field includes directing an electric current through a conductor formed on said magnetic head.

15. A method as in claim 10 wherein the step of terminating lapping includes interrupting the lapping process at a predefined distance prior to said lapping plate making contact with said magnetoresistive stripe.

* * * * *